(12) United States Patent
Deleeuw

(10) Patent No.: US 6,970,894 B2
(45) Date of Patent: Nov. 29, 2005

(54) METHOD FOR EXTRACTING INFORMATION FROM A FILE USING A PRINTER DRIVER

(75) Inventor: William C. Deleeuw, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 461 days.

(21) Appl. No.: 09/222,906

(22) Filed: Dec. 30, 1998

(65) Prior Publication Data

US 2003/0115551 A1 Jun. 19, 2003

(51) Int. Cl.[7] .............................................. G06F 15/00
(52) U.S. Cl. ....................................... 707/527; 715/529
(58) Field of Search ............................... 707/527, 530; 715/527, 530, 526, 529

(56) References Cited

U.S. PATENT DOCUMENTS

| | | | | |
|---|---|---|---|---|
| 5,670,995 A | * | 9/1997 | Kupcho et al. ................. | 347/5 |
| 5,696,841 A | * | 12/1997 | Nakatsuka ................... | 382/174 |
| 5,745,745 A | * | 4/1998 | Tada et al. ...................... | 707/1 |
| 5,809,167 A | * | 9/1998 | Al-Hussein ................. | 382/176 |
| 5,819,261 A | * | 10/1998 | Takahashi et al. ........ | 707/104.1 |
| 5,907,835 A | * | 5/1999 | Yokomizo et al. ............. | 707/1 |
| 5,930,810 A | * | 7/1999 | Farros et al. ............... | 715/506 |
| 5,992,737 A | * | 11/1999 | Kubota ....................... | 514/318 |
| 5,995,986 A | * | 11/1999 | Ueda et al. .................. | 715/516 |
| 6,031,625 A | * | 2/2000 | Sherman et al. ........... | 358/1.18 |
| 6,041,323 A | * | 3/2000 | Kubota .......................... | 707/3 |
| 6,078,936 A | * | 6/2000 | Martin et al. ................ | 715/527 |
| 6,101,513 A | * | 8/2000 | Shakib et al. ................ | 715/527 |
| 6,173,295 B1 | * | 1/2001 | Goertz et al. ................ | 715/505 |
| 6,188,807 B1 | * | 2/2001 | Arakawa ..................... | 382/319 |
| 6,247,010 B1 | * | 6/2001 | Doi et al. ....................... | 707/3 |
| 6,249,794 B1 | * | 6/2001 | Raman ........................ | 715/500 |
| 6,298,357 B1 | * | 10/2001 | Wexler et al. ............... | 715/513 |
| 6,445,462 B2 | * | 9/2002 | Aritomi ....................... | 358/1.9 |
| 2002/0010720 A1 | * | 1/2002 | Long et al. .................. | 707/527 |

OTHER PUBLICATIONS

Suen et al., Text String Extraction from Images of Colour-Printed Documents, IEEE 1996, pp. 210-216.*

* cited by examiner

Primary Examiner—Cong-Lac Huynh
(74) Attorney, Agent, or Firm—Kenyon & Kenyon

(57) ABSTRACT

A method and apparatus for extracting information from a file. A file is processed through an owning application with a printer driver to generate a representation having a modified format. Information is then extracted from the representation. The extracted information may include text strings and text characteristics of the text strings. The extracted information is then stored in a database. Local system processes or remote requesters may then search the database to locate files which include specific information. Using the text characteristic information, the located files are ranked according to the extent to which the specific information may be addressed within the located files.

4 Claims, 4 Drawing Sheets

METHOD FOR EXTRACTING INFORMATION FROM A FILE USING A PRINTER DRIVER

BACKGROUND

1. Field

The present invention pertains to extracting information included within a file. More specifically, the present invention relates to a method and apparatus for extracting and cataloging text and the text characteristics of that text from within a file.

2. Background Information

A network may be defined as a group of connected computers which allows users to share information and equipment. The group of connected computers typically includes one or more client computers connected to a server. The server stores information which may be accessed by the connected clients. The information stored on the server may include thousands of documents and files pertaining to a wide variety of subjects. Unfortunately, because many of the documents and files stored on the server are usually created using different application programs (such as Microsoft® Word, WordPerfect®, Excel®, and Powerpoint®), there are few effective methods which enable a network user to search these stored documents and identify all the documents which pertain to a particular subject. Similarly, there are few effective methods to search documents stored on one or more storage devices within a single computer when the documents are created using different application programs.

Currently, each application program employs different file formats. Thus, a searching application which enables a user to search for a particular subject within files or documents created using different application programs must be able to recognize the file format for each of the different application programs. Some application programs include methods for searching for specific text strings within documents created using that particular application program. For example, Microsoft® Word includes a document find function. Using the find function, a user may either highlight text within a particular document or enter text into a "find file" dialog box and then search for similar text within other documents created using Microsoft® Word.

There are several drawbacks associated with functions similar to Microsoft® Word's find function. First, these functions work only with documents created using the application program with which the function is associated. Second, the application program must be up and running to implement the function. Third, a significant amount of user interaction is required because the user must type in the specific text string which will be the subject of the search. Fourth, these functions are typically not capable of cataloging the entire document. Cataloging, as used herein, refers to storing the contents of a document in a manner which allows the document contents to be subsequently searched by a user. Cataloging the entire document expedites future searches of that document.

Another drawback of functions similar to Microsoft® Word's find function is that these functions are unable to rank search results according to hierarchy information. In this context, hierarchy information includes print characteristics of a string of text (e.g., font size, bold, underline, and position) which help determine whether the string of text is found within a title, within a paragraph sub-heading, or within a paragraph of a document. Hierarchy information helps the user determine the extent to which a particular string of text is addressed within a located document because text strings located in titles are likely to receive more extensive coverage within a document than text strings located within a paragraph sentence. When using a find function without a facility for ranking search results according to hierarchy information, a target word or text string within a sentence of a document appears to be just as important as the same target word or text string within a title of a document.

Accordingly, there is a need for a method and apparatus which enables a user to extract the contents of files created using different application programs and catalog the extracted contents in a manner which permits the user to subsequently search the cataloged contents to identify files which include information related to a particular subject. The search result should rank identified files according to the extent to which the files are likely to address the subject.

SUMMARY

According to an embodiment of the present invention, a method for extracting information from a file is provided. First, a file is processed with a printer driver to generate a representation of the file. Information is then extracted from the representation.

DETAILED DESCRIPTION

Although files created using different application programs include different file formats, printer drivers have a common interface for generating text output. Application programs link to printer drivers and instruct the printer driver to print text within a document using predetermined characteristics. A printer driver can be a block of software which facilitates printing a document or file by creating an interface between the execution of an application program and a printer. Printer drivers receive commands (instructions) from the execution of an application program. These commands tell the printer driver how to print individual parts of a file by identifying both the text within the file and the characteristics of that text. Examples of these text characteristics include the font size the user has selected for the string of text, whether the text string should be underlined and whether the text string should be printed in bold lettering. In one embodiment of the present invention, a custom printer driver is employed to extract and catalog both the text and text characteristics within a group of documents. Once cataloged, these documents may be searched to locate documents which include information relevant to a particular subject. The located documents may also be ranked according to the extent to which they are likely to address the particular subject.

Figure 1:
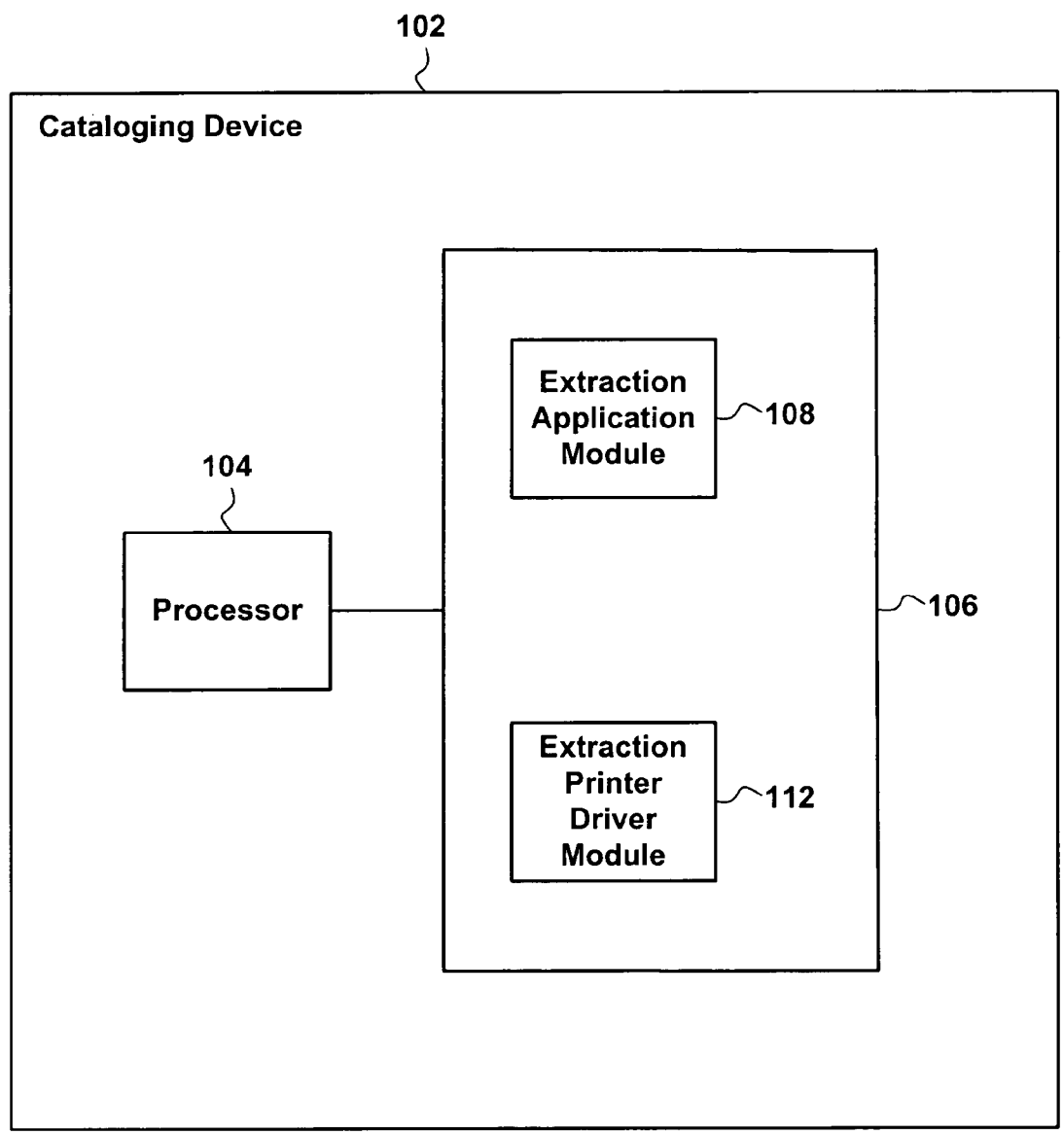
FIG. 1 illustrates a cataloging device, in accordance with an embodiment of the present invention.

FIG. 1 illustrates a cataloging device, in accordance with an embodiment of the present invention. Cataloging device 102 is a general purpose computer comprising a processor 104 connected to a computer readable memory 106. Processor 104 may be, for example, a Pentium® II Processor (available from Intel Corporation, Santa Clara, Calif.). Computer readable memory 106 can be Dynamic Random Access Memory (DRAM) that stores computer program code segments which, when executed by processor 104, implement the main functionality of this embodiment of the invention. These computer program code segments are separated into two modules: an extraction application module 108 and an extraction printer driver module 112. Although in this embodiment of the invention the computer program code segments are shown in two modules, it can be appreciated that these modules can be further separated into more modules or combined into one module, and still fall within the scope of the invention. The operation of each of these modules will be discussed in greater detail below.

Figure 2:
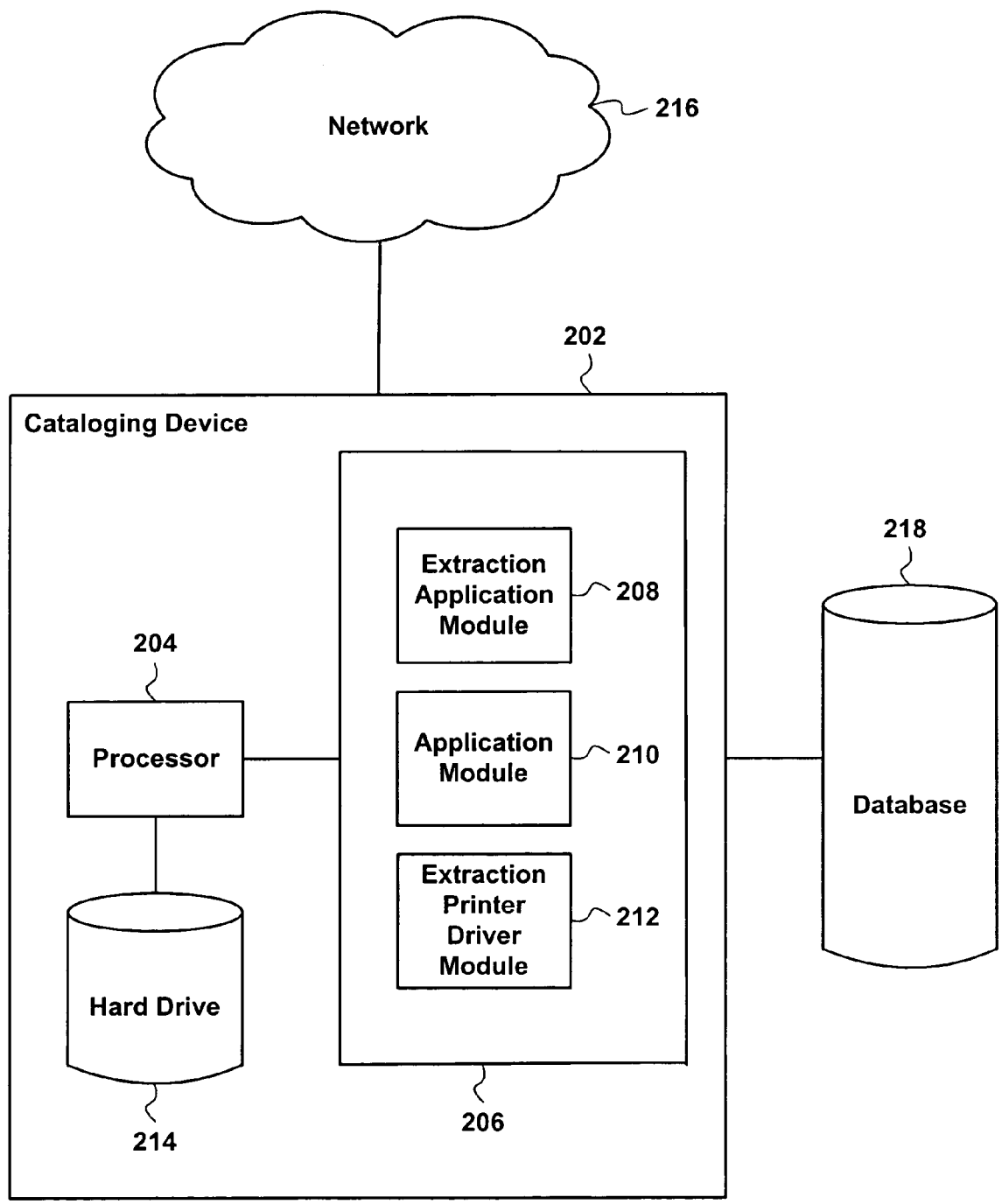
FIG. 2 illustrates a general block diagram of a system for cataloging files, in accordance with an embodiment of the present invention.

FIG. 2 illustrates a general block diagram of a system for cataloging files, in accordance with an embodiment of the present invention. In FIG. 2, a cataloging device 202 is connected to a network 216 and a database 218. In addition to the elements described in FIG. 1, cataloging device 202 includes an application module 210 within a computer readable memory 206 and optionally a hard drive 214 connected to a processor 204. The application module 210 may include computer program code segments for an application program such as Microsoft® Word, WordPerfect®, or Excel®. Hard drive 214 may be replaced with any of a variety of storage devices such as a compact disc recordable (CDR) drive, a floppy drive, random access memory (RAM), Compact Disc-Read Only Memory (CD-ROM), a network file system, and etc. Network 216 may be, for example, a local area network (LAN). Database 218 may be, for example, a Relevance Software Development Kit (SDK) available from Intel Corporation, Santa Clara, Calif. or Microsoft Access, available from Microsoft Corporation, Seattle, Wash.

The method for extracting and cataloging the contents of a file in accordance with the present invention will now be described with reference to FIG. 2. Hard drive 214 stores documents which may have been created using application module 210 or other application modules (not shown) which employ file formats that differ from the file format employed using application module 210. The contents of hard drive 214 are referred to herein as a "domain." A domain may include the contents of a hard drive or database, the contents of a portion of a hard drive or database, or the contents of more than one hard drive or database. In another embodiment of the present invention, the domain may include one or more mapped network drives attached to a network such as network 216 in FIG. 2.

For the purpose of this example, assume the method of the present invention has been previously employed to catalog the files included within this domain. To begin the current cataloging operation, extraction application module 208 retrieves a list of files for this domain (hard drive 214) which were previously cataloged (the "previous list"). The previous list may be stored, for example, in memory 206, on hard drive 214, or on a network. The previous list may include a filename for each cataloged file and the date/time the file was last modified by the user. Extraction application module 208 also creates a list of files currently stored on the search domain (the "current list") by walking the domain and noting existing files. The current list may include the filename and date information described above with reference to the previous list.

After obtaining the previous and current lists, extraction application module 208 compares the filenames and dates from the previous list with the filenames and dates from the current list. This comparison results in two new lists. The first list includes the filenames of files from the current list which were created or modified after the previous list was compiled. This first list is known as the "catalog list." The second list, known as the "uncatalog list," includes the filenames of files from the previous list which are not present in the current list and the filenames of files which were modified after the previous list was compiled. Before continuing the cataloging process, extraction application module 208 deletes all references in database 218 to files on the "uncatalog" list.

Next, extraction application module 208 identifies the "owning" application (application module 210, in this example) for the file associated with the first filename on the catalog list, launches the owning application, and instructs the owning application to send extraction printer driver module 212 instructions for printing the file. The owning application is the application used to create the file. In one embodiment, the owning application is identified by consulting the Windows® registry to find the application used to view files with an identical file extension. Once the Windows® registry is used to identify the owning application, the Windows® registry is then used to identify the command line used to cause the owning application to print the file. Extraction application module 208 then executes this identified command. In another embodiment, extraction application module 208 may call the Windows® "ShellExecuteEx" function with the filename and the print instruction. In yet another embodiment, "object linking and embedding" (OLE) is used to obtain an interface which may be used to print the document.

In this embodiment, extraction printer driver module 212 includes a real or virtual printer driver that converts printing instructions from an application (e.g., application module 210) into a format for output to another device or system. Thus, a real printer driver would convert printing instructions into a modified format which is output to a printer while a virtual printer driver would convert the printing instructions into a possibly different format which is not specifically output to an actual printer. As used herein, "printer driver module" refers to a driver module that is used to convert printing instructions into a format for output to another device or system, such as a printer, a facsimile machine, or the like. The printer driver module can also convert printing instructions into a format for access on an intranet, the Internet, or the World Wide Web (e.g., using the Net-It Now software application (available from Net-It Software Corporation, San Francisco, Calif.)).

After receiving the instructions from extraction application module 208, application module 210 sends extraction printer driver module 212 instructions on how to "draw" the pages to be printed. Some of these instructions will likely include drawing strings of text. Extraction printer driver module 212 then separates the text within the received file into a series of text strings of varying length and analyzes the text characteristics of each text string. These text characteristics may include (among other items) the font, the font size, whether the font is underlined, whether the font is in bold, and the positioning of the text on the page. Next, extraction printer driver module 212 creates a list including the filename associated with each text string, the actual text string, and the text characteristics of that text string. Hierarchy information is derived from the text characteristics and helps to indicate whether a particular text string is located within a title, within a subtitle or within a paragraph of a document. Generally, titles and paragraph headings are either printed in a larger font size than the font size chosen for the rest of a file, printed in bold, printed with underlining, or positioned differently. Listing hierarchy information with a particular text string enables a user who subsequently searches the cataloging system to determine the extent to which the subject of a text string may be addressed within a particular file.

Once each text string within the file has been listed, extraction printer driver module 212 stores the list in database 218. The system of FIG. 2 repeats the above steps until each file on the catalog list has been stored in database 218. To complete the cataloging process, extraction application module 208 will store the "current list" as the "previous list."

After a domain has been cataloged, a user may access database 218 to search that domain for text references to a particular subject matter. For example, suppose a user wishes to locate all files within the domain which include references to "rocket ships." A search of database 218 will locate all files which include the term "rocket ships" in the text, and rank the located files according to how extensively the subject of rocket ships is likely to be covered within the located files. In an embodiment where database 218 is a Relevance SDK, a search for the term "rocket ships" may also result in locating files which include related terms such as "spaceship."

Figure 3:
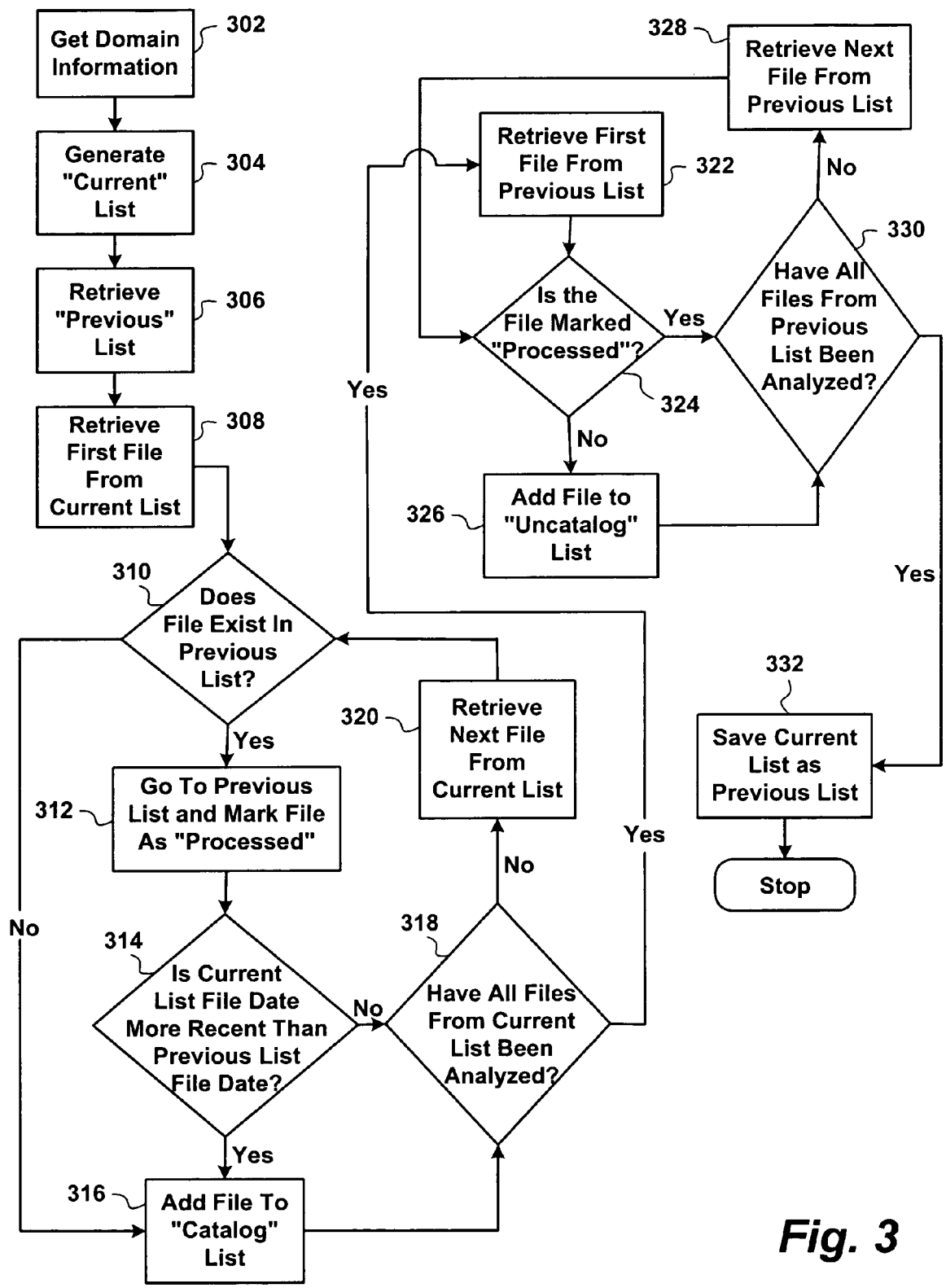
FIG. 3 is a flow chart illustrating the process of generating a catalog list and an uncatalog list, in accordance with an embodiment of the present invention.

FIG. 3 is a flow chart illustrating the process of generating a catalog list and an uncatalog list, in accordance with an embodiment of the present invention. This process may be implemented, for example, as a computer program executed by a processor or as computer hardware using well-known signal processing techniques. If implemented in software, the computer program instructions are stored in computer-readable memory, such as Read-Only Memory (ROM), Random Access Memory (RAM), magnetic disk (e.g, 3.5" diskette or hard drive), optical disk (e.g., Compact Disc-Read Only Memory (CD-ROM)), etc. The computer hardware or software implementing the various embodiments of the invention may be located, for example, in a cataloging device as described above. More particularly, these steps may be located within memory 206 as extraction application module 208.

In 302, the system receives information which defines the domain which will be cataloged. This information may include all or a portion of hard drives, network drives, and etc. In 304, the system generates a current list which includes the files currently stored within the received domain. In 306, the system retrieves the previous list which includes the files previously cataloged for this domain by the system. In 308, the system retrieves the first file from the current list. Next, in 310, the system determines whether the first file from the current list exists in the previous list.

If (in 310) the system determines the file exists in the previous list, the system concludes the file has not been deleted from the domain since the last time the domain was cataloged and proceeds to 312. In 312, the system marks this file as "processed" in the previous list and proceeds to 314. In 314, the system determines whether the date for this file on the current list is more current than the date for this particular file in the previous list. If (in 314) the system determines the current list date is more current than the previous list date, the file has likely been modified since the last time the file was cataloged and will need to be recataloged. Thus, in 316, the system adds the file to a "catalog" list, removes the "processed" marking on that file in the "previous list," and proceeds to 318. If (in 314) the system determines the current list date is not more current than the previous list date, the system proceeds to 318.

If (in 310) the system determines the filename does not exist in the previous list, the file has not been previously cataloged. Thus, the system proceeds to 316 and adds the file to the "catalog" list. After 316, the system proceeds to 318.

In 318, the system determines whether all files from the current list have been analyzed. If not, the system proceeds to 320 to retrieve the next file from the current list. The system then proceeds to 310. If (in 318) all the files from the current list have been analyzed, the catalog list for this domain is complete and the system proceeds to 322.

In 322, the system begins the process of generating the uncatalog list. The uncatalog list may be used to delete files from the cataloging system which either no longer exist in the current domain or have been modified since the last time this domain was cataloged. In 322, the system retrieves the first file from the previous list. In 324, the system determines whether this first file has been marked as processed. If (in 324), the system determines the file has been marked as processed, the analysis of this file is complete and the system proceeds to 330. If (in 324) the system determines the file has not been marked as processed, the system proceeds to 326 and adds the file to an "uncatalog" list. The system then proceeds to 330.

In 330 the system determines whether all files from the previous list have been analyzed. If all the files have not been analyzed, the system proceeds to 328 and retrieves the next file from the previous list. The system then proceeds to 324. If (in 330) the system determines all the files have been analyzed, the system proceeds to 332 and saves the current list as the previous list.

Figure 4:
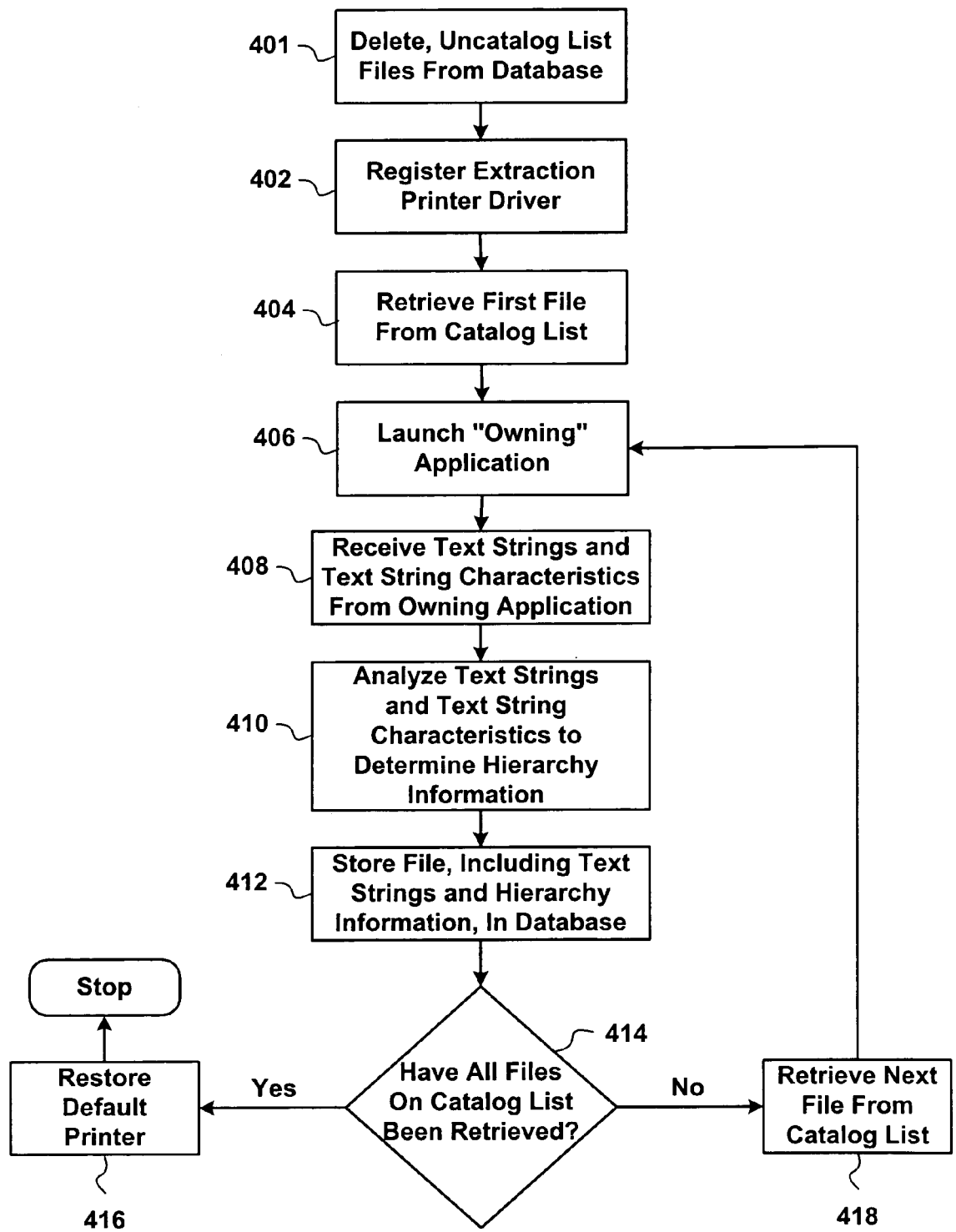
FIG. 4 is a flow chart illustrating the process of cataloging and uncataloging domain files, in accordance with an embodiment of the present invention.

Once a catalog list and an uncatalog list are created for a domain, the system database may be updated with the current domain information. FIG. 4 is a flow chart illustrating the process of cataloging and uncataloging domain files, in accordance with an embodiment of the present invention. This process may be implemented, for example, as a computer program or as computer hardware using well-known signal processing techniques. If implemented in software, the computer program instructions may be stored in computer-readable memory, such as Read-Only Memory (ROM), Random Access Memory (RAM), magnetic disk (e.g., 3.5" diskette or hard drive), optical disk (e.g., Compact Disc-Read Only Memory (CD-ROM)), etc. The computer program instructions are executed using a processor using well known techniques. The computer hardware or software implementing the various embodiments of the invention may be located, for example, in a cataloging device as described above. More particularly, these steps are an example of the computer program segments stored in memory 206 as extraction application module 208 and extraction printer driver module 212.

In 401, the system deletes all references to all files included on the uncatalog list from the database. In 402, the system registers an extraction printer driver (such as extraction printer driver module 212, described above) as the primary printing device for the operating system. In 404, the system retrieves the first file from the catalog list. In 406, the system launches the owning application (such as application module 210 described with reference to FIG. 2) used to create the file and instructs the application to send the file (with print instructions) to the extraction printer driver. In 408, the extraction printer driver receives the text strings and text string characteristics of the file from the owning application. In 410, the extraction printer driver analyzes the received text strings and text string characteristics for hierarchy information. In 412, the extraction printer driver stores the file (including the file name, text strings, text string characteristics and hierarchy information) in a database (such as database 218 described with reference to FIG. 2). In 414, the system determines whether all files from the catalog list have been cataloged. If all files have been cataloged, the system proceeds to 416 and restores the default printer as the primary printing device for the operating system. If (in 414) all files have not been cataloged, the system proceeds to 418 and retrieves the next file from the catalog list. The system then proceeds to 406.

Although several embodiments are specifically illustrated and described herein, it will be appreciated that modifications and variations of the present invention are covered by the above teachings and within the purview of the appended claims without departing from the spirit and intended scope of the invention. For example, although in the system described with reference to FIG. 2, the extraction application module, application module, and extraction printer driver module are included within the cataloging device, one or more of these elements may be located within a network connected to the cataloging device.

What is claimed is:

1. A method for extracting information from a file, comprising:

processing a file with a printer driver module to generate a representation having a modified format for output by a printer;

extracting a text string, including at least one text characteristic of said text string, from said representation;

storing said text string and said at least one text characteristic of said text string in a data base;

launching an owning application used to create said file;

instructing said owning application to print said file using said printer driver module;

obtaining a current list of files and a previous list of files;

comparing said current list with said previous list to identify new files and modified files; and repeating the processing, extracting, and storing steps for each new file and each modified file.

2. The method of claim 1, further comprising searching said database for at least one document which includes desired text.

3. A set of instructions residing in a storage medium, said set of instructions capable of being executed by a processor to implement a method for extracting information from a file, the method comprising:

processing a file with a printer driver module to generate a representation having a modified format for output by a printer;

extracting a text string, including at least one text characteristic of said text string, from said representation;

storing said text string and said at least one text characteristic of said text string in a data base;

launching an owning application used to create said file;

instructing said owning application to print said file using said printer driver module;

extracting text information from said modified file;

obtaining a current list of files and a previous list of files;

comparing said current list with said previous list to identify new files and modified files; and repeating the processing, extracting, and storing steps for each new file and each modified file.

4. The method of claim 3, further comprising searching said database for at least one document which includes desired text.

* * * * *